No. 820,575. PATENTED MAY 15, 1906.
F. G. HUGHES & R. P. STOUT.
WHEEL BEARING.
APPLICATION FILED DEC. 10, 1902.
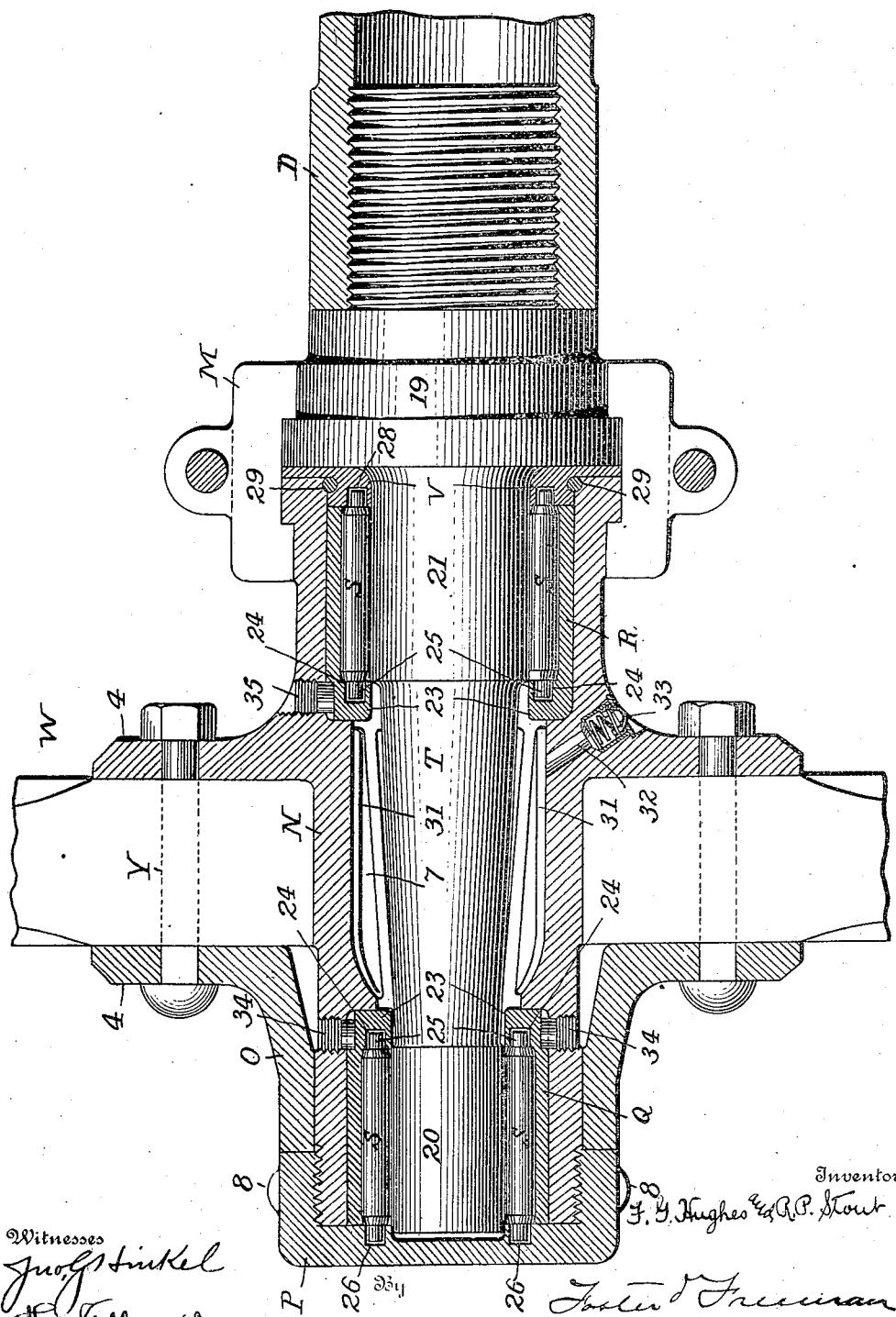

UNITED STATES PATENT OFFICE.

FREDERICK G. HUGHES AND ROBERT P. STOUT, OF BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

WHEEL-BEARING.

No. 820,575.     Specification of Letters Patent.     Patented May 15, 1906.

Application filed December 10, 1902. Serial No. 134,665.

*To all whom it may concern:*

Be it known that we, FREDERICK G. HUGHES and ROBERT P. STOUT, citizens of the United States, residing at Bethlehem, in the county of Northampton and State of Pennsylvania, have invented certain new and useful Improvements in Wheel-Bearings, of which the following is a specification.

Our invention relates to the journals and hubs of wheels primarily intended for use in connection with the wheels of vehicles, but adapted to be employed wherever a wheel rotates upon a spindle with intervening friction-bearings; and our invention consists in providing the journal with cylindrical bearing portions for antifriction-rolls and the hub with detachable annular bearings or sleeves for said rolls and constructing the parts as fully set forth hereinafter, so as to facilitate access to the parts, permit the ready removal of the rolls and detachable bearings, and exclude dust, all as set forth hereinafter and as illustrated in the accompanying drawing, in which the figure is a longitudinal section of a journal, part of an axle, and wheel-hub embodying our improvements.

The axle D terminates in a journal T, which may be secured to or form part of the axle and which has a flange 19 at the rear, a cylindrical bearing portion 21 adjacent to the flange, and a terminal cylindrical bearing portion 20, said bearing portion being adapted to antifriction-rolls S S, carried by the hub of the wheel W. Within said hub are two annular bearings or sleeves Q R, of hardened and ground steel, which inclose the antifriction-rollers S S and which are secured immovably in the hub in any suitable manner. As shown, one end of each sleeve Q R has an annular flange 23 with an annular groove 24, adapted to receive studs 25, projecting from the rollers at one end.

The studs at the outer end of the rollers S, within the sleeve Q, extend into an annular groove 26 in a cap P, having a threaded flange adapted to the end of the inner tubular section N of the hub, the end of the flange of the cap P bearing against the edge of the other section O of the hub, which section incloses the outer end of the inner section, and each section of the hub is provided with an annular flange 4, the butts of the spokes fitting between the two flanges 4 4 and being secured by bolts Y, passing through the flanges and through grooves formed in the adjacent spokes.

An annular retaining-ring V is secured to the inner hub-section N and has an annular recess 28 to receive the studs 25 at the inner ends of the rollers S within the sleeve R, the ring V being secured to the hub-section N by taper-pins 29, passing transversely through openings formed partly within the ring V and partly in the hub.

Between the central portion of the journal and the hub-section N is an oil-chamber 7, which, as shown, is formed partly in a recess of the journal and partly in the corresponding recess of the hub, and upon the latter is a series of longitudinal flanges or ribs 31, which agitate and disperse the oil admitted to the chamber through an opening 32, provided with a self-closing valve 33. By this agitation the lubricant is thoroughly distributed and carried toward both the bearings and to both series of antifriction-rollers.

It will be seen that the inner edge of the hub fits closely against the flange 19 of the journal, while the cap P completely seals the journal and bearings at the outer end, so that there is no possibility of the access of dust to the parts. The hub is held against the flange 19, but so as to turn freely upon the journal, by means of a clamping-ring M, or in any other suitable manner.

It will be seen that the cap P may be readily removed, as by a spanner engaging lugs 8 on the cap, and that this permits ready access to remove the outer rolls S or the sleeve Q, which is prevented from turning by a screw-stud 34, the end of which engages the flat face of the sleeve, and that by driving out the pins 29 the ring V may be removed, permitting access to the inner series of rolls S and also the removal of the sleeve R, which is prevented from turning by a screw-stud 35.

It will be seen that the sleeves Q R are detachable longitudinally on the removal of the cap P and ring V and that as the rollers are retained in connection with the hub by their studs fitting the annular grooves of the cap and ring and sleeves the wheel may be removed from the axle without separating the rollers from their sleeves.

Without limiting ourselves to the precise construction and arrangement of parts shown, we claim—

1. The combination of a journal having a bearing portion, a hub, an internal removable sleeve therein, having an end flange with an annular groove therein, a detachable cap having an annular groove, antifriction-rolls between said bearing portion and sleeve and extending at their ends into said grooves, and means to prevent the sleeve from turning while permitting its longitudinal withdrawal, substantially as set forth.

2. The combination of the hub having a fixed flange and movable flange, a journal provided with a sleeve, bearing-rollers between said journal and sleeve, and a cap P bearing on and confining both the sleeve and the movable flange, substantially as set forth.

In testimony whereof we have signed our names to this specification in the presence of two subscribing witnesses.

FREDERICK G. HUGHES.
ROBERT P. STOUT.

Witnesses:
PAUL E. KRESSLY,
JOHN ROSEWARNE.